(12) United States Patent
Furuya

(10) Patent No.: US 7,413,064 B2
(45) Date of Patent: Aug. 19, 2008

(54) FRONT FORK

(75) Inventor: Ken Furuya, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 77 days.

(21) Appl. No.: 11/202,236

(22) Filed: Aug. 12, 2005

(65) Prior Publication Data

US 2006/0054437 A1     Mar. 16, 2006

(30) Foreign Application Priority Data

Aug. 27, 2004  (JP) ............................. 2004-248374

(51) Int. Cl.
    *F16F 9/34*     (2006.01)
(52) U.S. Cl. ................................ 188/282.1; 188/314
(58) Field of Classification Search .................. 188/314, 188/315, 282.1, 282.7, 282.8
    See application file for complete search history.

(56) References Cited

U.S. PATENT DOCUMENTS

| | | | | |
|---|---|---|---|---|
| 2,738,036 A | * | 3/1956 | Crabtree | 188/315 |
| 3,078,967 A | * | 2/1963 | Brown et al. | 188/289 |
| 3,213,973 A | * | 10/1965 | Damon | 188/287 |
| 3,584,712 A | * | 6/1971 | Dickinson | 188/282.1 |
| 3,795,291 A | * | 3/1974 | Naito et al. | 188/274 |
| 4,139,182 A | * | 2/1979 | Nagase et al. | 267/120 |
| 4,240,531 A | * | 12/1980 | Postema | 188/315 |
| 4,325,468 A | * | 4/1982 | Siorek | 188/282.8 |
| 4,502,673 A | * | 3/1985 | Clark | 267/64.24 |
| 4,786,034 A | * | 11/1988 | Heess et al. | 267/64.15 |
| 4,807,860 A | * | 2/1989 | Simons | 267/217 |
| 4,971,180 A | * | 11/1990 | Kobayashi et al. | 188/282.4 |
| 5,324,067 A | * | 6/1994 | Kallenbach et al. | 280/5.519 |
| 5,375,683 A | * | 12/1994 | Huang et al. | 188/266.6 |
| 5,392,885 A | * | 2/1995 | Patzenhauer et al. | 188/282.1 |
| 5,588,510 A | * | 12/1996 | Wilke | 188/266.6 |
| 5,738,191 A | * | 4/1998 | Forster | 188/318 |
| 6,345,707 B1 | * | 2/2002 | Klembczyk | 188/298 |
| 6,464,048 B1 | * | 10/2002 | Groves et al. | 188/266.6 |
| 6,619,445 B2 | * | 9/2003 | Forster | 188/315 |
| 6,619,446 B2 | * | 9/2003 | Rottenberger et al. | 188/322.16 |
| 6,926,128 B2 | * | 8/2005 | Barbison et al. | 188/315 |
| 6,971,493 B2 | * | 12/2005 | Yoshimoto | 188/312 |
| 7,004,293 B2 | * | 2/2006 | Schurmans | 188/322.17 |
| 7,017,720 B2 | * | 3/2006 | Yoshimoto | 188/315 |

FOREIGN PATENT DOCUMENTS

JP      2004-44643      2/2004

* cited by examiner

*Primary Examiner*—Pam Rodriguez
(74) *Attorney, Agent, or Firm*—Rabin & Berdo, PC

(57) ABSTRACT

One of a pair of the hydraulic shock absorbers each mounted in the right and left sides of a front wheel for a two-wheel vehicle includes a contraction-side damping valve (5a) disposed in a flow passage (11) communicating a rod-side oil chamber (R1) with a piston-side oil chamber (R2), the contraction-side damping valve (5a) permitting an operating oil to flow from the piston-side oil chamber (R2) to the rod-side oil chamber (R1) only when a volume in the piston-side oil chamber (R2) is reduced, and a contraction-side check valve (6) disposed in a flow passage (10) communicating the piston-side oil chamber (R2) with the reservoir (R), the contraction-side check valve (6) permitting the operating oil to flow from the reservoir (R) to the piston-side oil chamber (R2) only when a volume in the piston-side oil chamber (R2) is increased.

4 Claims, 2 Drawing Sheets

FRONT FORK

FIELD OF THE INVENTION

The present invention relates to a front fork, and in particular, to a front fork in a front wheel side of a two-wheel vehicle.

BACKGROUND OF THE INVENTION

JP2004-44643A published by the Japan Patent Office in 2004 has disclosed a front fork, which is provided with one fork body including a hydraulic shock absorber for production of an expansion-side damping force performing production of an expansion-side damping force, and the other fork body including a hydraulic shock absorber for production of a contraction-side damping force performing production of a contraction-side damping force.

SUMMARY OF THE INVENTION

According to the front fork disclosed in JP2004-44643A, in each hydraulic shock absorber for producing the expansion-side or contraction-side damping force, lack of an operating oil possibly occurs in a cylinder when the hydraulic shock absorber operates in the opposite direction to the direction for producing the damping force. Therefore, after the lack of the operating oil occurs, in a case where the hydraulic shock absorber reverses its motion in the opposite direction and operates toward the direction for producing the damping force, a predetermined, stable damping force is not possibly produced.

In view of the above, there exists a need for a front fork which overcomes the above-mentioned problems in the related art. The present invention addresses this need in the related art, as well as other needs, which will become apparent to those skilled in the art from this disclosure.

An object of the present invention lies in that in a case where, when a hydraulic shock absorber produces one of expansion-side and contraction-side damping forces, lack of an operating oil does not occur in a cylinder at the time the hydraulic shock absorber operates in the opposite direction to the direction for producing a damping force, and thereafter, the hydraulic shock absorber reverses its motion in the opposite direction and operates in the direction for producing the damping force, a predetermined damping force is securely produced.

In order to achieve above object, this invention provides a front fork comprising a pair of hydraulic shock absorbers each mounted in the right side and left side of a front wheel for a two-wheel vehicle. Each of the pair of the hydraulic shock absorbers includes a cylinder, a piston rod inserted in the cylinder to enter into and go out from the cylinder. Each of the pair of the hydraulic shock absorbers includes a piston received in the cylinder and connected to the piston rod, the piston defining a rod-side oil chamber and a piston-side oil chamber inside the cylinder and having a first flow passage to communicate the rod-side oil chamber with the piston-side oil chamber. Further each of the pair of the hydraulic shock absorbers includes a reservoir communicated through a second flow passage with the rod-side oil chamber and the piston-side oil chamber. One of the pair of the hydraulic shock absorbers includes a contraction-side damping valve and a contraction-side check valve. The contraction-side damping valve is disposed in the first flow passage, and permits an operating oil to flow from the piston-side oil chamber to the rod-side oil chamber when travel of the piston decreases a volume in the piston-side oil chamber, and prohibits the operating oil to enter from the rod-side oil chamber to the piston-side oil chamber when travel of the piston increases the volume in the piston-side oil chamber. The contraction-side check valve is disposed in the second flow passage, and prohibits the operating oil to flow from the piston-side oil chamber to the reservoir when travel of the piston decreases the volume in the piston-side oil chamber, and permits the operating oil to flow from the reservoir to the piston-side oil chamber when travel of the piston increases the volume in the piston-side oil chamber.

This invention also provides a front fork comprising a pair of hydraulic shock absorbers each mounted in the right side and left side of a front wheel for a two-wheel vehicle. Each of the pair of the hydraulic shock absorbers includes a cylinder, a piston rod inserted in the cylinder to enter into and go out from the cylinder. Each of the pair of the hydraulic shock absorbers includes a piston received in the cylinder and connected to the piston rod, the piston defining a rod-side oil chamber and a piston-side oil chamber inside the cylinder and having a first flow passage to communicate the rod-side oil chamber with the piston-side oil chamber. Further each of the pair of the hydraulic shock absorbers includes a reservoir communicated through a second flow passage with the rod-side oil chamber and the piston-side oil chamber. One of the pair of the hydraulic shock absorbers includes an expansion-side damping valve and an expansion-side check valve. The expansion-side damping valve is disposed in the first flow passage, and permits an operating oil to flow from the rod-side oil chamber to the piston-side oil chamber when travel of the piston decreases a volume in the rod-side oil chamber, and prohibits the operating oil to enter from the piston-side oil chamber to the rod-side oil chamber when travel of the piston increases the volume in the rod-side oil chamber. The expansion-side check valve is disposed in the second flow passage, and prohibits an operating oil to flow from the reservoir to the rod-side oil chamber when travel of the piston decreases the volume in the rod-side oil chamber, and permits the operating oil to flow from the reservoir to the rod-side oil chamber when travel of the piston increases the volume in the rod-side oil chamber.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will be explained with reference to the drawings. It will be apparent to those skilled in the art from this disclosure that the following description of the embodiment of the present invention is provided for illustration only, and not for the purpose of limiting the present invention as defined by the appended claims and their equivalents.

A front fork of the present invention is provided with a pair of hydraulic shock absorbers, which are mounted respectively in the right side and left sides of a front wheel for a motorbike. One of the pair of the hydraulic shock absorbers each mounted in the right side and left side of the front wheel for the motorbike is formed of a unitary flow structure, in which an expansion-side damping force is not produced at the expansion operation time, and a predetermined contraction-side damping force is produced at the contraction operation time.

Figure 1:
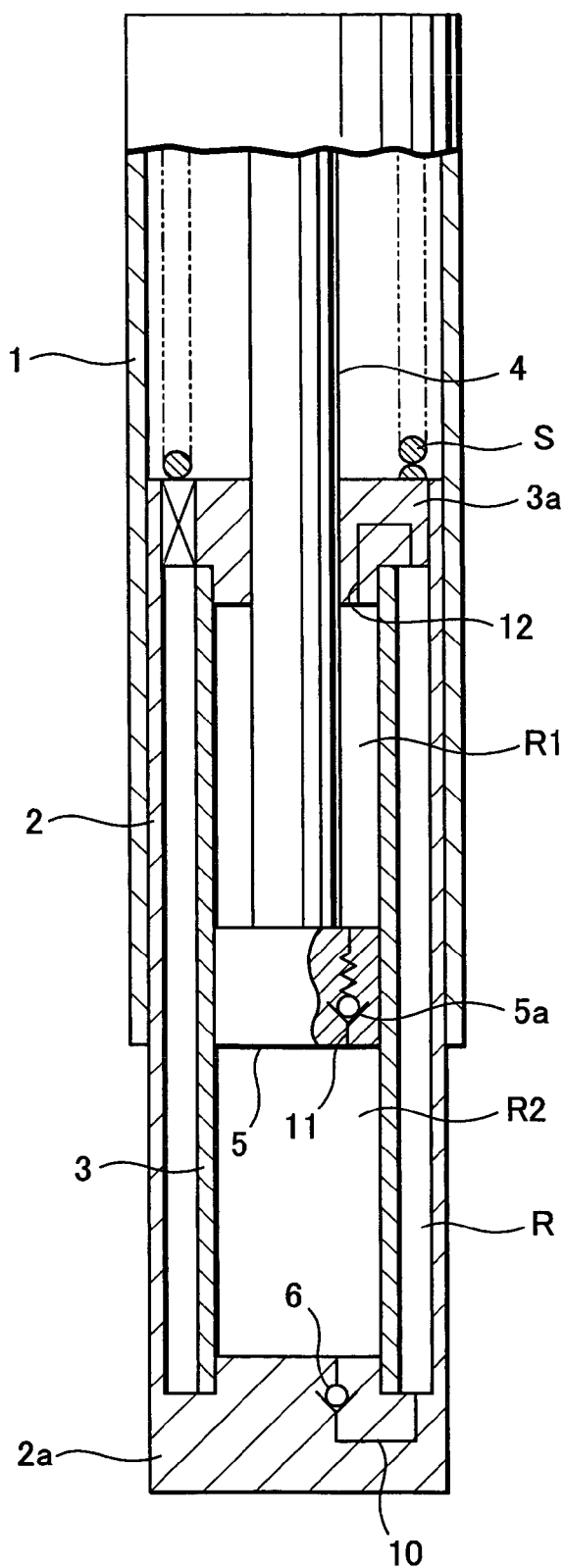
FIG. 1 is a view showing a schematic arrangement of a hydraulic shock absorber in a unitary flow structure for producing a contraction-side damping force according to the present invention.

A hydraulic shock absorber for production of a contraction-side damping force is, as shown in FIG. 1, arranged with an outer tube 1 and an inner tube 2, which is inserted in the outer tube 1 so that the inner tube 2 enters into the outer tube 1 and goes out from the outer tube 1 under a water proof structure. The outer tube 1 and the inner tube 2 define a fork body in the front fork.

A suspension spring S is disposed between the outer tube 1 and the inner tube 2 where the inner tube 2 is biased by the suspension spring S to go out from the outer tube 1 such that the fork body expends.

The hydraulic shock absorber is provided with a damping portion in an axis of the fork body. In the damping portion, a cylinder 3 is disposed at an axis of the inner tube 2, and a piston rod 4 is disposed at an axis of the outer tube 1 where the piston rod 4 is inserted in the cylinder 3 to enter into or go out from the cylinder 3.

In FIG. 1, an opening in the upper side of the cylinder 3 is closed by a head member 3a through which the piston rod 4 penetrates at the axis, and an opening of the lower side of the cylinder 3 is closed by a bottom member 2a of the inner tube 2.

A piston 5 connected to an end of the piston rod 4 is slidably received in the cylinder 3, thereby defining a rod-side oil chamber R1 and a piston-side oil chamber R2 within the cylinder 3.

A reservoir R is defined between an outer wall of the cylinder 3 and an inner wall of the inner tube 2. The reservoir R is communicated with the rod-side oil chamber R1 through a flow passage 12 disposed in the head member 3a with no resistance, namely, freely, and is communicated with the piston-side oil chamber R2 through a flow passage 10 disposed in the bottom member 2a. A contraction-side check valve 6 is disposed in the flow passage 10.

The contraction-side check valve 6 permits flow of an operating oil from the reservoir R to the piston-side oil chamber R2, and prohibits flow of the operating oil from the piston-side oil chamber R2 to the reservoir R.

The piston 5 is provided with a flow passage 11 communicating between the piston-side oil chamber R2 and the rod-side oil chamber R1. In addition, the flow passage 11 is provided with a contraction-side damping valve 5a therein for producing a predetermined contraction-side damping force. The contraction-side damping valve 5a permits flow of the operating oil from the piston-side oil chamber R2 to the rod-side oil chamber R1, and prohibits flow of the operating oil from the rod-side oil chamber R1 to the piston-side oil chamber R2 where, when the operating oil flows from the piston-side oil chamber R2 into the rod-side oil chamber R1, a predetermined contraction-side damping force is produced.

Accordingly, in the hydraulic shock absorber for production of the contraction-side damping force, when the inner tube 2 enters into the outer tube 1, namely at the contraction operation time the piston rod 4 enters into the cylinder 3, the operating oil in the piston-side oil chamber R2 flows through the contraction-side damping valve 5a into the rod-side oil chamber R1 where the operating oil passes through the contraction-side damping valve 5a, thereby producing a predetermined contraction-side damping force.

An amount of the operating oil corresponding to the piston entering volume becomes an extra oil amount in the rod-side oil chamber R1 among the operating oil flown into the rod-side oil chamber R1, and the extra oil amount flows out through the flow passage 12 disposed in the head member 3a of the cylinder 3 into the reservoir R.

On the other hand, when the inner tube 2 goes out from the outer tube 1, namely at the expansion operation time the piston rod 4 goes out from the cylinder 3, the contraction-side damping valve 5a disposed in the piston 5 prohibits flow of the operating oil from the rod-side oil chamber R1 to the piston-side oil chamber R2, and the operating oil flows out through the flow passage 12 disposed in the head member 3a from the rod-side oil chamber R1 into the reservoir R.

Then, an amount of an operating oil corresponding to the rod retreat volume lacking in the piston-side oil chamber R2 is supplied through the contraction-side check valve 6 from the reservoir R to the piston-side oil chamber R2.

As described above, according to the present invention a predetermined contraction-side damping force is produced in the contraction-side damping valve 5a disposed in the piston 5 in the hydraulic shock absorber of a unitary flow structure at the contraction operation time, and when the hydraulic shock absorber reverses its motion from the contraction operation to the expansion operation, the operating oil lacking in the piston-side oil chamber R2 is supplied directly through the contraction-side check valve 6 from the reservoir R.

In the hydraulic shock absorber defining a front fork disclosed in JP2004-44643A, when the operating oil lacks in the lower oil chamber, the operating oil is flown from the reservoir to the upper oil chamber firstly, and then, the flown operating oil is supplied through a valve disposed in a piston to the lower oil chamber. That is, the operating oil is supplied indirectly to the lower oil chamber. In contrast, according to the preferred embodiment of the present invention, the operating oil lacking in the piston-side oil chamber R2 is supplied through the contraction-side check valve 6 from the reservoir R. That is, the operating oil is supplied directly to the piston-side oil chamber R2. Therefore, supply insufficiency of the operating oil in the piston-side oil chamber R2 at the expansion operation time is prevented, and as a result, when the hydraulic shock absorber reverses its motion from the expansion operation to the contraction operation, during the contraction operation the stable contraction-side damping force is produced.

As described above, in the front fork in use of the hydraulic shock absorber for production of the contraction-side damping force, a predetermined contraction-side damping force can be obtained at the contraction-side operation time without insufficiency of the operating oil in the piston-side oil chamber R2 at the expansion operation time.

Next, an expansion-side hydraulic shock absorber which is the other of the pair of the expansion-side hydraulic shock absorber and the contraction-side hydraulic shock absorber, namely, a hydraulic shock absorber for production of an expansion-side damping force will be explained with reference to FIG. 2.

The hydraulic shock absorber for production of the expansion-side damping force produces a predetermined expansion-side damping force at an expansion operation time, and does not produce a contraction-side damping force at a contraction operation time when the hydraulic shock absorber reverses its motion from the expansion operation time. The hydraulic shock absorber for production of the expansion-side damping force is formed of a unitary flow structure the same as in the hydraulic shock absorber for production of the contraction-side damping force shown in FIG. 1.

Figure 2:
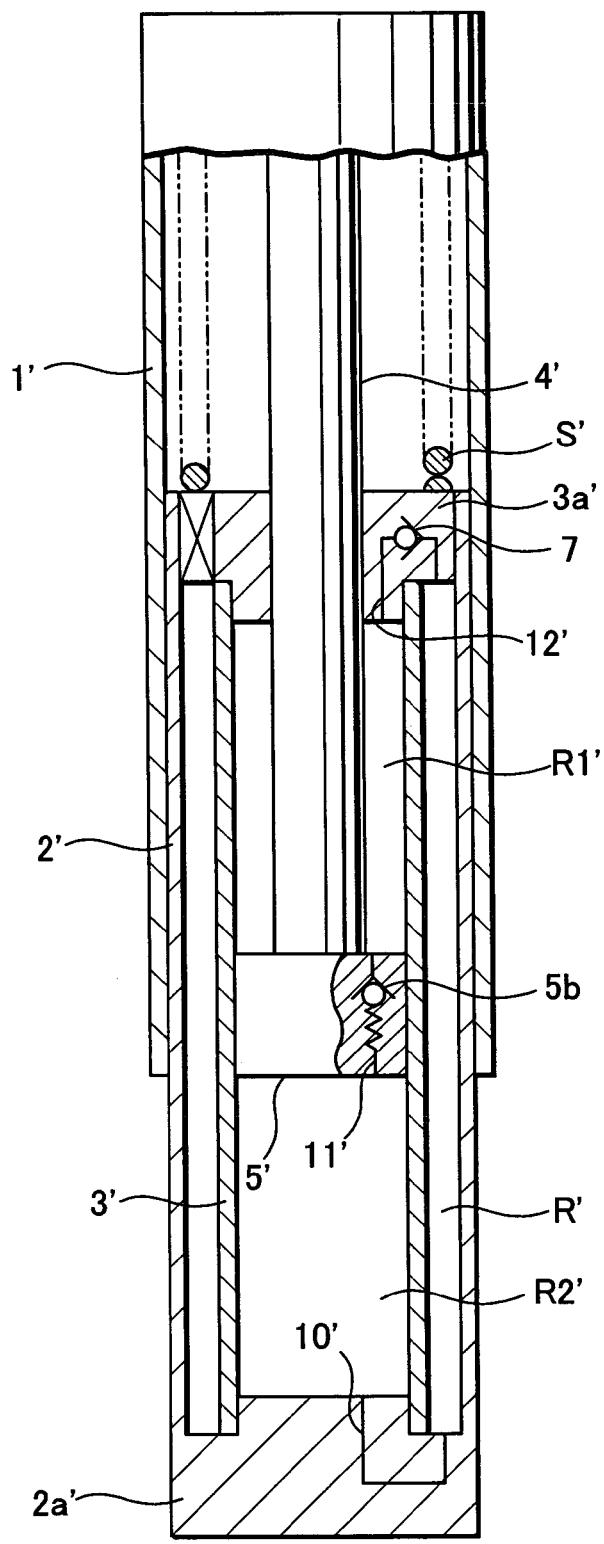
FIG. 2 is a view showing a schematic arrangement of a hydraulic shock absorber in a unitary flow structure for producing an expansion-side damping force according to the present invention.

A hydraulic shock absorber for production of an expansion-side damping force shown in FIG. 2 is arranged with an outer tube 1' and an inner tube 2', which is inserted in the outer tube 1' so that the inner tube 2' enters into the outer tube 1' and goes out from the outer tube 1' under a water proof structure. The outer tube 1' and the inner tube 2' define a fork body in the front fork.

A suspension spring S' is disposed between the outer tube 1' and the inner tube 2' where the inner tube 2' is biased by the suspension spring S' to go out from the outer tube 1' such that fork body expands.

The hydraulic shock absorber is provided with a damping portion at an axis of the fork body. In the damping portion, a cylinder 3' is disposed at an axis of the inner tube 2', and a piston rod 4' is disposed at an axis of the outer tube 1' where the piston rod 4' is inserted in the cylinder 3' to enter into or go out from the cylinder 3'.

In FIG. 2, an opening in the upper side of the cylinder 3' is closed by a head member 3a' through which the piston rod 4' penetrates at the axis, and an opening of the lower side of the cylinder 3' is closed by a bottom member 2a' of the inner tube 2'.

A piston 5' connected to an end of the piston rod 4' is slidably received in the cylinder 3', thereby defining a rod-side oil chamber R1' and a piston-side oil chamber R2' within the cylinder 3'.

A reservoir R' is defined between an outer wall of the cylinder 3' and an inner wall of the inner tube 2'. The reservoir R' is communicated with the piston-side oil chamber R2' through a flow passage 10' disposed in a bottom member 2a' with no resistance, namely, freely, and is communicated with the rod-side oil chamber R1' through a flow passage 12' disposed in a head member 3a'. An expansion-side check valve 7 is disposed in the flow passage 12'.

The expansion-side check valve 7 permits flow of an operating oil from the reservoir R' to the rod-side oil chamber R1', and prohibits flow of the operating oil from the rod-side oil chamber R1' to the reservoir R'.

The piston 5' is provided with a flow passage 11' communicating between the piston-side oil chamber R2' and the rod-side oil chamber R1'. In addition, the flow passage 11' is provided with an expansion-side damping valve 5b for producing a predetermined expansion-side damping force. The expansion-side damping valve 5b permits flow of the operating oil from the rod-side oil chamber R1' to the piston-side oil chamber R2', and prohibits flow of the operating oil from the piston-side oil chamber R2' to the rod-side oil chamber R1' where, when the operating oil flows from the rod-side oil chamber R1' to the piston-side oil chamber R2', a predetermined expansion-side damping force is produced.

Accordingly, in the hydraulic shock absorber for production of the expansion-side damping force, when the inner tube 2' goes out from the outer tube 1', namely at the expansion operation time the piston rod 4' goes out from the cylinder 3', flow of the operating oil in the rod-side oil chamber R1' to the reservoir R' is blocked by the expansion-side check valve 7, and enters into the piston-side oil chamber R2' where the operating oil passes through the expansion-side damping valve 5b, thereby producing a predetermined expansion-side damping force.

An amount of the operating oil corresponding to the volume of a rod retreat of the piston rod 4' becomes insufficient in the piston-side oil chamber R2', and the insufficient operating oil is supplied through the flow passage 10' disposed in the bottom member 2a' of the inner tube 2' from the reservoir R' to the piston-side oil chamber R2'.

On the other hand, when the inner tube 2' enters into the outer tube 1', namely at the contraction operation time the piston rod 4' enters into the cylinder 3', the expansion-side damping valve 5b disposed in the piston 5' prohibits flow of the operating oil from the piston-side oil chamber R2' to the rod-side oil chamber R1', and the operating oil flows out through the flow passage 10' disposed in the bottom member 2a' from the piston-side oil chamber R2' into the reservoir R'.

Then, an amount of an operating oil corresponding to the rod entering volume lacking in the rod-side oil chamber R1' is supplied through the expansion-side check valve 7 from the reservoir R' to the rod-side oil chamber R1'.

As described above, according to the present invention a predetermined expansion-side damping force is produced at the expansion-side damping valve 5b disposed in the piston 5' at the expansion operation time of the hydraulic shock absorber of a unitary flow structure, and when the hydraulic shock absorber reverses its motion from the expansion operation to the contraction operation, the operating oil lacking in the rod-side oil chamber R1' is supplied directly through the expansion-side check valve 7 from the reservoir R'.

In the hydraulic shock absorber defining a front fork disclosed in JP2004-44643A, when the operating oil lacks in the upper oil chamber, the operating oil is flown from the reservoir to the lower oil chamber firstly, and then, that operating oil is supplied through a valve disposed in a piston to the lower oil chamber. That is, the operating oil is supplied indirectly to the lower oil chamber. In contrast, according to the preferred embodiment of the present invention, the operating oil lacking in the rod-side oil chamber R1' is supplied through the expansion-side check valve 7 from the reservoir R'. That is, the operating oil is supplied directly to the rod-side oil chamber R1'. Therefore, supply insufficiency of the operating oil in the rod-side oil chamber R1' at the contraction operation time is prevented, and as a result, when the hydraulic shock absorber reverses its motion from the contraction operation to the expansion operation, during the expansion operation the stable expansion-side damping force is produced.

An example where a two-wheel vehicle equipped with a front fork is a motorbike is explained in the preferred embodiment, but the two-wheel vehicle may be a bicycle, in which the identical function/effect can be achieved.

In addition, a pair of hydraulic shock absorbers for production of a contraction-side damping force and an expansion-side damping force are disposed in a front wheel of the two-wheel vehicle, but only either one of the hydraulic shock absorbers for production of the contraction-side damping force and the expansion-side damping force may be disposed.

That is, one of hydraulic shock absorbers in a front fork may be arranged as a hydraulic shock absorber in a unitary flow structure according to the present invention, and the other of the hydraulic shock absorbers may be arranged as a hydraulic shock absorber other than the hydraulic shock absorber in a unitary flow structure.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A front fork, comprising:
a pair of hydraulic shock absorbers each mounted in the right side and left side of a front wheel for a two-wheel vehicle, wherein:
each of the pair of the hydraulic shock absorbers includes:
a cylinder;
a piston rod inserted in the cylinder to enter into and go out from the cylinder;
a piston received in the cylinder and connected to the piston rod, the piston defining a rod-side oil chamber and a piston-side oil chamber inside the cylinder and having a first flow passage to communicate the rod-side oil chamber with the piston-side oil chamber, and
a reservoir communicated through a second flow passage with the rod-side oil chamber and the piston-side oil chamber, but wherein:
only one of the pair of the hydraulic shock absorbers further includes:
a contraction-side damping valve disposed in the first flow passage, the contraction-side damping valve permitting an operating oil to flow from the piston-side oil chamber to the rod-side oil chamber when travel of the piston decreases a volume in the piston-side oil chamber, and prohibiting the operating oil to enter from the rod-side oil chamber to the piston-side oil chamber when travel of the piston increases the volume in the piston-side oil chamber, and
a contraction-side check valve disposed in the second flow passage, the contraction-side check valve prohibiting the operating oil to flow from the piston-side oil chamber to the reservoir when travel of the piston decreases the volume in the piston-side oil chamber, and permitting the operating oil to flow from the reservoir to the piston-side oil chamber when travel of the piston increases the volume in the piston-side oil chamber; and
wherein the only one of the pair of the hydraulic shock absorbers lacks an expansion-side damping valve and an expansion-side check valve.

2. The front fork according to claim 1, wherein the contraction-side damping valve and the contraction-side check valve constitute the only valves in a flow path of the operating oil by which the operating oil flows among the piston-side oil chamber, the rod-side oil chamber and the reservoir.

3. A front fork, comprising:
a pair of hydraulic shock absorbers each mounted in the right side and left sides of a front wheel for a two-wheel vehicle, wherein:
each of the pair of the hydraulic shock absorbers includes:
a cylinder;
a piston rod inserted in the cylinder to enter into and go out from the cylinder;
a piston received in the cylinder and connected to the piston rod, the piston defining a rod-side oil chamber and a piston-side oil chamber inside the cylinder and having a first flow passage to communicate the rod-side oil chamber with the piston-side oil chamber, and
a reservoir communicated through a second flow passage with the rod-side oil chamber and the piston-side oil chamber, but wherein:
only one of the pair of the hydraulic shock absorbers further includes:
an expansion-side damping valve disposed in the first flow passage, the expansion-side damping valve permitting an operating oil to flow from the rod-side oil chamber to the piston-side oil chamber when travel of the piston decreases a volume in the rod-side oil chamber, and prohibiting the operating oil to enter from the piston-side oil chamber to the rod-side oil chamber when travel of the piston increases the volume in the rod-side oil chamber, and
an expansion-side check valve disposed in the second flow passage, the expansion-side check valve prohibiting an operating oil to flow from the reservoir to the rod-side oil chamber when travel of the piston decreases the volume in the rod-side oil chamber, and permitting the operating oil to flow from the reservoir to the rod-side oil chamber when travel of the piston increases the volume in the rod-side oil chamber; and
wherein the only one of the pair of the hydraulic shock absorbers lacks a contraction-side damping valve and a contraction-side check valve.

4. The front fork according to claim 3, wherein the expansion-side damping valve and the expansion-side check valve constitute the only valves in a flow path of the operating oil by which the operating oil flows among the piston-side oil chamber, the rod-side oil chamber and the reservoir.

* * * * *